United States Patent [19]

Clancey

[11] Patent Number: 4,705,149

[45] Date of Patent: Nov. 10, 1987

[54] FLUID COUPLING DEVICE HAVING INCREASED TORQUE-TRANSMITTING CAPABILITY

[75] Inventor: Stephen M. Clancey, Battle Creek, Mich.

[73] Assignee: Eaton Corporation, Cleveland, Ohio

[21] Appl. No.: 731,179

[22] Filed: May 6, 1985

[51] Int. Cl.[4] .................. F16D 35/00; F16D 43/25
[52] U.S. Cl. ............................. 192/58 B; 192/82 T
[58] Field of Search ............... 192/58 B, 58 A, 82 T

[56] References Cited

U.S. PATENT DOCUMENTS

| | | | |
|---|---|---|---|
| 2,948,268 | 8/1960 | Roper et al. | 192/58 B |
| 3,059,745 | 10/1962 | Tauschek | 192/58 B |
| 3,217,849 | 11/1965 | Weir | 192/82 T |
| 3,329,246 | 7/1967 | Kaplan | 192/58 B |
| 3,536,173 | 10/1970 | Merkert | 192/58 C X |
| 3,757,914 | 9/1973 | Elmer | 192/82 T X |
| 3,856,122 | 12/1974 | Leichliter | 192/58 B |
| 4,086,987 | 5/1978 | Riley et al. | 192/82 T X |
| 4,278,159 | 7/1981 | Roth et al. | 192/58 B |
| 4,405,039 | 9/1983 | Hauser | 192/82 T X |
| 4,444,300 | 4/1984 | Hayashi et al. | 192/58 B |
| 4,446,952 | 5/1984 | Masai | 192/58 B |

FOREIGN PATENT DOCUMENTS 2089945 6/1982 United Kingdom .............. 192/82 T

Primary Examiner—Rodney H. Bonck
Assistant Examiner—David A. Testardi
Attorney, Agent, or Firm—D. A. Rowe; L. J. Kasper

[57] ABSTRACT

A fluid coupling device is disclosed of the type including a rotatable coupling assembly (73) including a housing member (75) and a cover member (77) which define a fluid chamber therebetween. A coupling member (71) is disposed in the fluid chamber and its forward surface and adjacent surface of the cover member (77) define a viscous shear space. The cover member (77) includes a plurality of cooling fins (85) disposed on the forward surface of the cover member. The coupling assembly (73) defines a maximum predetermined radius R. The cover member (77) and housing member (75) are joined at an annular outer urface (93) and an annular inner surface (97), these surfaces being disposed rearwardly of the shear space. The cover member (77) defines an annular inner surface (101) which is the outer periphery of the fluid chamber. The coupling member (71) includes an annular inner surface having a radius in the range of about 0.87 R to about 0.93 R to increase substantially the radius of the viscous shear space and the radius of efficient cooling fins, in relationship to the radius R of the coupling device.

13 Claims, 2 Drawing Figures

FLUID COUPLING DEVICE HAVING INCREASED TORQUE-TRANSMITTING CAPABILITY

BACKGROUND OF THE DISCLOSURE

The present invention relates to rotary torque-transmitting fluid coupling devices, and more particularly to such devices wherein heat is generated as a result of the torque transmission, and the ability to dissipate such heat represents a limiting factor on the torque-transmitting capability of the device.

Although the present invention may be used with various types and configurations of rotary torque-transmitting fluid coupling devices, it is especially adapted for use with coupling devices which operate on the viscous shear principle, and will be described in connection therewith.

Fluid coupling devices of the type to which the present invention relates have found many uses, one of the most common of which is to drive the cooling fan associated with the radiator of a vehicle engine. Such coupling devices are frequently referred to as "viscous fan drives" because the coupling utilizes a high-viscosity fluid to transmit torque, by means of viscous shear drag, from an input coupling member (clutch) to an output coupling member (housing) to which is bolted the cooling fan.

This invention is especially advantageous when used on a relatively high-torque viscous fan drive, i.e., a fan drive which is capable of transmitting to the cooling fan in the range of about 2 horsepower to about 12 horsepower. Typically, such high-torque or high-horsepower fan drives include an output coupling assembly comprising a cast aluminum housing and a die cast aluminum cover. The input coupling member and the die cast cover normally define a plurality of interdigitated lands and grooves which define the viscous shear space. When this shear space is filled with viscous fluid, torque can be transmitted from the input member to the output assembly.

The torque-transmitting capability of a viscous fan drive is determined by three primary factors: the total viscous shear area; the mean radius of the shear area; and the viscosity of the viscous fluid. Theoretically, the torque-transmitting capability of the viscous fan drive can be increased simply by increasing any one or more of the above-noted factors. However, this approach to increasing torque capability results in certain disadvantages. For example, increasing the viscous shear area, such as by increasing the number of lands and grooves, has conventionally meant increasing the overall size, weight, and manufacturing expense of the fan drive. The same would be true with regard to increasing the mean radius of the viscous shear area. Increasing the torque capacity by increasing the viscosity of the fluid is not a satisfactory solution because it becomes more difficult to pump fluid from the operating chamber to the reservoir chamber as the fluid viscosity increases.

During torque transmission, a substantial amount of heat is generated as a result of the shearing of the viscous fluid between the interdigitated lands and grooves. The amount of heat generated is approximately proportional to the "slip" speed of the fan drive, i.e., the difference between the speed of the input coupling and the speed of the output coupling. As is well known to those skilled in the art, the ability to transmit torque is limited by the ability of the viscous fan drive to dissipate the heat which is generated. If the temperature of the viscous fluid exceeds a certain predetermined maximum temperature, the result will be a deterioration in the viscous properties of the fluid, resulting in a loss of torque-transmitting capability of the drive. Conversely, as the heat-dissipating capability of a viscous fan drive is increased, and the viscous fluid is maintained at a lower temperature, it is possible to achieve a required torque-transmitting capability by means of a smaller, lower cost fan drive. Therefore, those working in the viscous fan drive art have been attempting for many years to increase the heat-dissipating capability of the various fan drive designs.

As was mentioned previously, simply increasing the size of the fan drive and the resulting shear area and mean radius of the shear area is not always a desirable or practical way to increase the torque-transmitting capacity of a viscous fan drive. In addition, there are many situations and applications wherein "packaging" limitations within the engine compartment require that the fan drive not exceed a maximum, predetermined radius. Therefore, in such applications, it is important to be able to increase the torque-transmitting capability of the viscous fan drive without exceeding the maximum, predetermined radius of the unit.

SUMMARY OF THE INVENTION

Accordingly, it is an object of the present invention to provide an improved torque-transmitting fluid coupling device having increased torque-transmitting capacity without increasing the overall size of the coupling device.

It is another object of the present invention to provide a coupling device which is capable of achieving the above-stated objects while at the same time having increased heat dissipation capability.

It is a more specific object of the present invention to provide a coupling device in which the viscous shear space has its radius increased substantially without the coupling device exceeding a maximum, predetermined radius.

The above and other objects of the invention are accomplished by the provision of an improved fluid coupling device of the type including a first rotatable coupling assembly comprising a housing member and a cover member cooperating to define a fluid chamber therebetween, and means for joining the housing member and cover member. A second rotatable coupling member is disposed in the fluid chamber and is rotatable relative to the first coupling assembly. The forward surface of the second coupling member and an adjacent surface of the cover member cooperate to define a viscous shear space therebetween. The cover member includes a plurality of cooling fins disposed on the forward surface of the cover member the cooling fins being operable to dissipate heat transmitted from the viscous shear space by the cover member. The first coupling assembly defines a maximum, predetermined radius R of the coupling device.

The improved fluid coupling device is characterized by the means for joining the cover member and the housing member comprising the housing member and the cover member defining surfaces in facing engagment, the surfaces being disposed rearwardly of the shear space. The cover member defines a first annular inner surface comprising the outer periphery of the fluid chamber, and the second coupling member includes a first annular outer surface closely spaced apart from the second annular inner surface of the cover member. The first annular outer surface has a radius in the range of about, 0.87R to about 0.93R to increase substantially the radius of the viscous shear space and the radius of efficient cooling fins, in relationship to the radius R of the fluid coupling device.

DESCRIPTION OF THE PREFERRED EMBODIMENT

Figure 1:
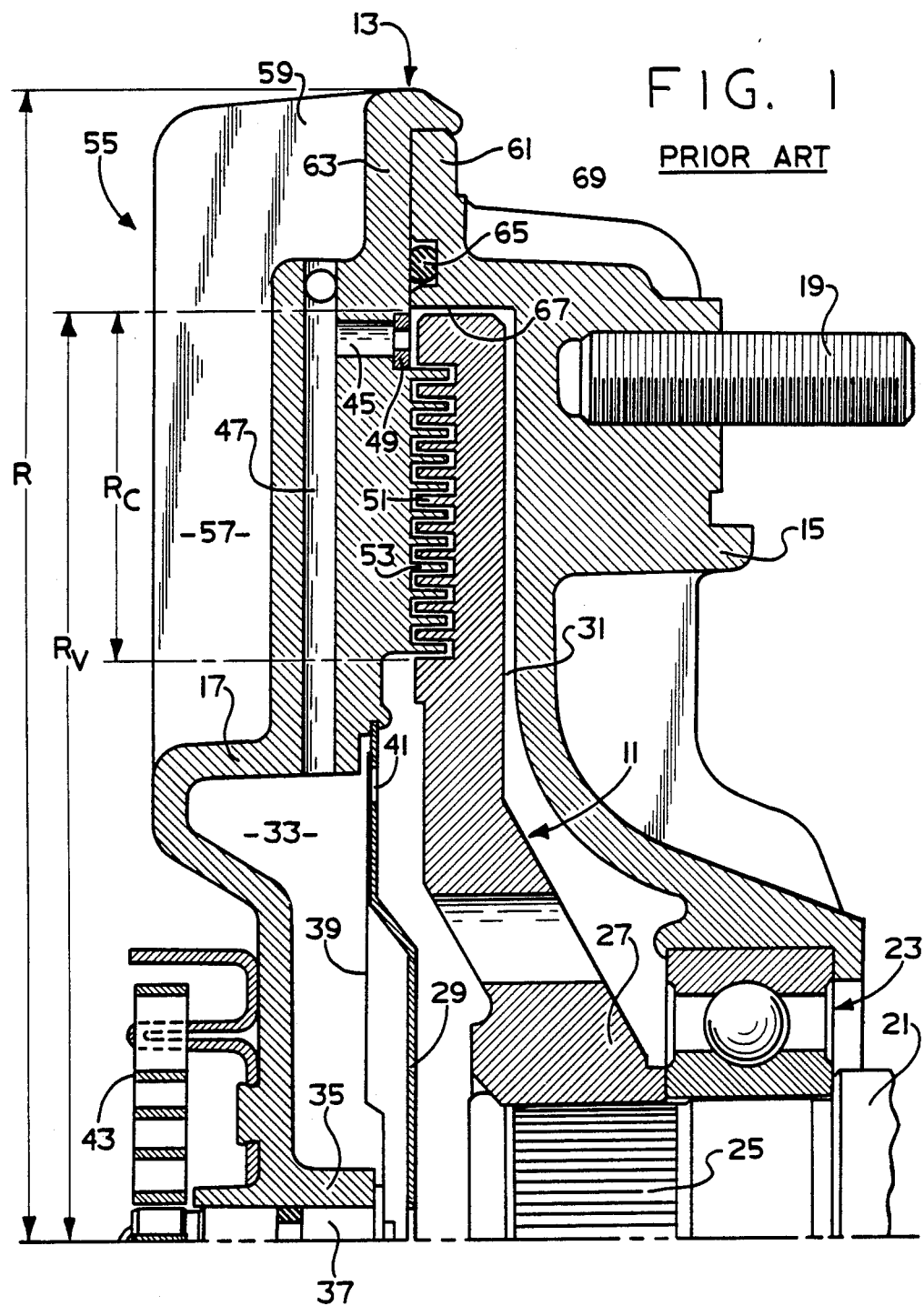
FIG. 1 is an axial cross-section of the upper half of a viscous fan drive made in accordance with the prior art.

Referring now to the drawings, which are not intended to limit the invention, FIG. 1 illustrates a typical prior art viscous fan drive to which the present invention may be applied. To provide a better understanding of the invention, the prior art device will be described first, and then the differences between the present invention and the prior art device will be specifically pointed out.

The prior art fluid coupling device includes an input coupling member, generally designated 11, and an output coupling assembly, generally designated 13. The output coupling assembly 13 includes a housing member 15 and a die cast cover member 17, the members 15 and 17 being secured together by a rollover of the outer periphery of the cover member 17, as is well known in the art. The members 15 and 17 could also be secured together by means of a plurality of bolts, or by any other suitable means. The fluid coupling is adapted to have a radiator cooling fan attached to the housing member 15 by means of a plurality of threaded members 19. It will be understood, however, that the use of the present invention is not limited to any particular configuration of fluid coupling device, except as specifically noted hereinafter.

The fluid coupling device includes an input shaft 21 on which the input coupling member 11 is mounted. The input shaft 21 is rotatably driven, typically by being attached to the engine water pump. The input shaft 21 functions as a support for the inner race of a bearing set 23, which is seated on the inside diameter of the housing member 15. The forward end (left end in FIG. 1) of the input shaft 21 has an interference fit between a serrated portion 25 and an opening defined by a hub portion 27 of the input coupling member 11. As a result, rotation of the input shaft 21 causes rotation of the input coupling member 11.

The housing member 15 and the cover member 17 cooperate to define a fluid chamber which is separated, by means of a circular valve plate 29, into a fluid operating chamber (working chamber) 31, and a fluid reservoir chamber 33. Thus, it may be seen that the input coupling member 11 is disposed within the fluid operating chamber 31.

The cover member 17 defines a generally cylindrical shaft support portion 35, and rotatably disposed within the portion 35 is a valve shaft 37 extending outwardly (to the left in FIG. 1. through the cover member 17. Attached to the inner end (right end in FIG. 1) of the valve shaft 37 is a valve arm 39, the general construction of which forms no part of the present invention, but which may be better understood by reference to U.S. Pat. No. 3,055,473, assigned to the assignee of the present invention and incorporated herein by reference. Movement of the valve arm 39 controls the flow of fluid from the reservoir chamber 33 to the operating chamber 31, through a fill opening 41 formed in the valve plate 29.

Operatively associated with the outer end of the valve shaft 37 is a temperature-responsive bimetal coil 43. The manner in which the bimetal coil 43 operates to control the movement of the valve arm 39, in response to variations in a predetermined temperature condition, is well known in the art, is not an essential feature of the present invention, and will not be described further herein.

The cover member 17 defines an axial passage 45 in communication with the fluid operating chamber 31, and a radial passage 47 which provides fluid communication from the axial passage 45 to the fluid reservoir chamber 33. Disposed adjacent the axial passage 45 is a pumping element (wiper) 49, operable to engage the relatively rotating fluid in the operating chamber 31, to generate a localized region of relatively higher fluid pressure, and to continually pump a small quantity of fluid back into the reservoir chamber 33, through the passages 45 and 47, as is well known in the art.

In fluid coupling devices of the type to which the present invention relates, the input coupling member 11 typically includes a forward surface which defines a plurality of annular lands 51. The adjacent surface of the cover member 17 forms a plurality of annular lands 53. The annular lands 51 and 53 are interdigitated to define a serpentine-shaped viscous shear space therebetween. It is believed that in view of above-incorporated U.S. Pat. No. 3,055,473, those skilled in the art can fully understand the construction and operation of the prior art fluid coupling device illustrated in FIG. 1, as well as the various flow paths for the viscous fluid contained therein. It should be understood, however, that the use of the interdigitated lands 51 and 53 is not an essential feature of the present invention. What is essential, however, is that the forward surface of the coupling member 11 and the adjacent surface of the housing member 17 define a viscous shear space.

As noted in the background portion of the specification, when torque is transmitted from the vehicle engine by means of the input shaft 21 to the input coupling member 11, the result is a shearing of the viscous fluid contained in the shear space. This shearing of the viscous fluid results in generation of a substantial amount of heat which must be dissipated primarily by the cover member 17.

Referring still to FIG. 1, it may be seen that in the prior art coupling device, the cover member 17 included a plurality of radially oriented cooling fins, generally designated 55. For purposes of explaining the present invention, each of the cooling fins 55 will be described as comprising two different "portions", even though it will be understood that each of the prior art cooling fins actually comprises one continuous fin member. Each of the cooling fins 55 in the prior art fan drive comprises a forward cooling fin portion 57, and a peripheral cooling fin portion 59. As one important aspect of the present invention, it has been discovered that the forward cooling fin portion 57 is substantially more efficient in dissipating heat from the viscous shear space than is the peripheral cooling fin portion 59. Therefore, in order to achieve the object of having increased heat dissipation capability, it has been recognized as part of the present invention that it is necessary to increase the radial extent of the forward cooling fin portions 57. It should be noted in the prior art device shown in FIG. 1 that the relatively more efficient, forward cooling fin portion 57 corresponds approximately with the viscous shear space defined by the forward surface of the input coupling member 11.

Referring still to FIG. 1, the prior art coupling device is illustrated as having an overall radius R, which typically is determined by the radius of the cover member 17. It is also typical that the radius R of the coupling device cannot exceed a predetermined, maximum radius because of various packaging limitations within the engine compartment. Therefore, it is always an important consideration in any coupling device design to achieve the maximum possible torque-transmitting capacity without exceeding the predetermined, maximum radius R.

In the prior art device of FIG. 1, the housing member 15 includes an outer, flange-like portion 61, while the cover member 17 defines a similar, adjacent flange-like portion 63. The portions 61 and 63 are disposed in face-to-face engagement on a transverse plane, and the portion 61 defines three sides of a gland in which is disposed an O-ring 65. As is well known to those skilled in the art, the function of the O-ring 65 is to prevent leakage of viscous fluid between the portions 61 and 63, as a result of the buildup of fluid pressure within the operating chamber 31. It is important to note in the prior art device of FIG. 1 that, because of the face-to-face engagement of the flange-like portions 61 and 63, and the arrangement of the gland for the O-ring 65, there is a relatively large radial extent of the peripheral cooling fin portions 59. As noted previously, the peripheral cooling fin portions 59 are substantially less efficient in dissipating heat. Furthermore, in the prior art device, the outer periphery of the operating chamber 31 is defined by an annular inner surface 67 of the housing member 15. As a result, a substantial amount of the heat generated toward the outer periphery of the shear space is transmitted to the housing member 15 and a set of rear cooling fins 69, formed about the periphery of the cover member 15. As will be apparent to those skilled in the art, the rear cooling fins 59 are substantially less efficient in dissipating heat from the viscous shear space because they are not in the path of the air passing through the vehicle radiator (flowing from left to right in FIG. 1), as are the front cooling fins 55. Furthermore, very little of the heat generated at the periphery of the working chamber 31 is transmitted to the peripheral cooling fin portions 59, because of the interface between the flange-like portions 61 and 63.

PRESENT INVENTION

Figure 2:
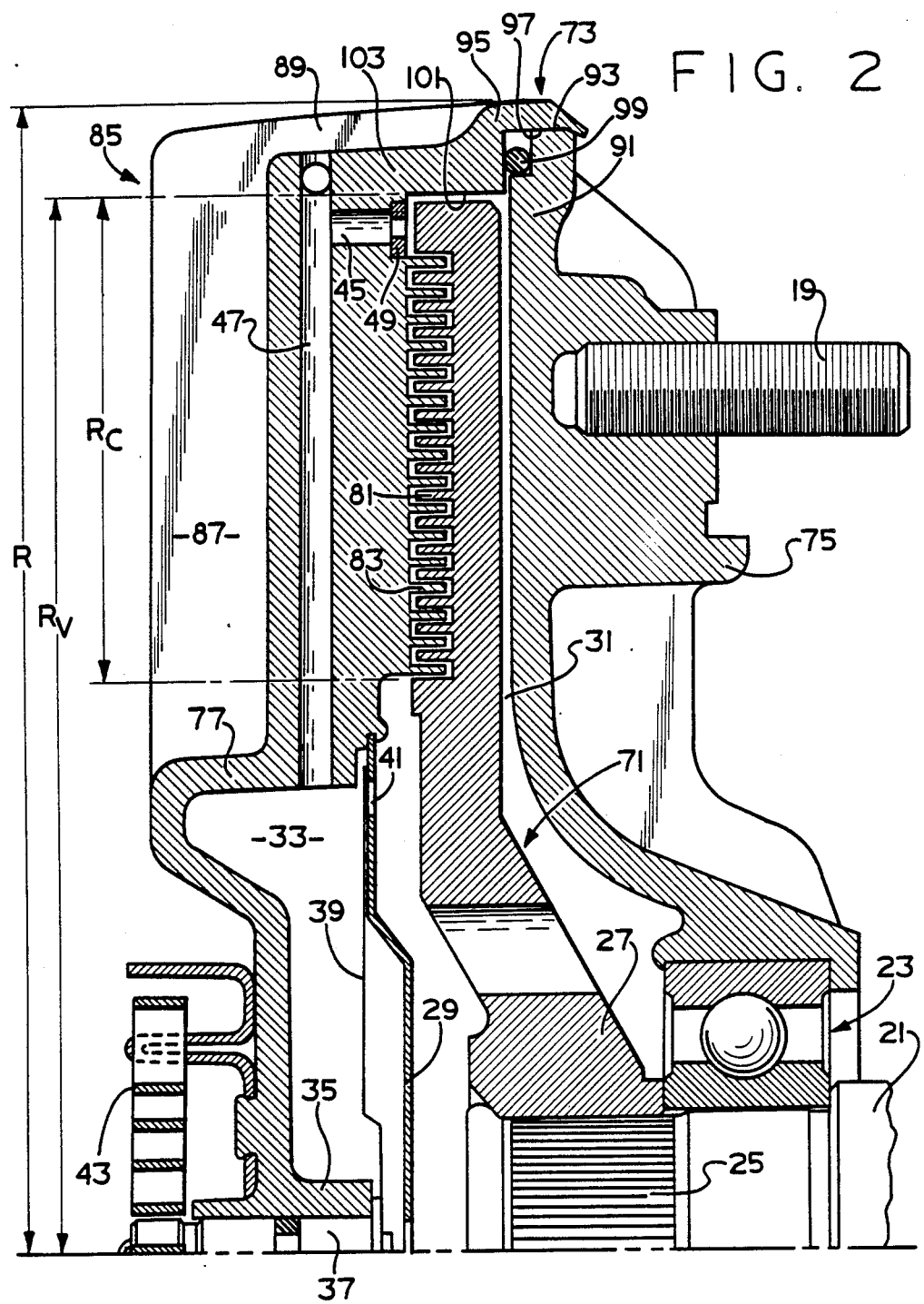
FIG. 2 is an axial cross-section, on the same scale as FIG. 1, of the upper half of a viscous fan drive made in accordance with the present invention.

Referring now to FIG. 2, the present invention will be described in some detail, with elements which are the same or substantially the same as in the prior art device of FIG. 1 bearing the same reference numerals, while elements which are substantially different bear reference numerals in excess of 70.

The fluid coupling device of the present invention includes an input coupling member 71, and an output coupling assembly, generally designated 73. The output coupling assembly 73 includes a housing member 75 and a die cast cover member 77. Although each of these items 71, 73, 75 and 77 have generally the same configuration and function as the corresponding elements from the prior art device, they are modified in the present invention to an extent that they are assigned new reference numerals herein, and will be described in some detail. All of the elements from the prior art device of FIG. 1 bearing reference numerals 19 through 49 are substantially the same in the embodiment of the present invention, and therefore, bear the same reference numerals, and will not be described further herein.

The input coupling member 71 includes a forward surface which defines a plurality of annular lands 81, while the adjacent surface of the cover member 77 forms a plurality of annular lands 83. The annular lands 81 and 83 are interdigitated to define a serpentine-shaped viscous shear space therebetween. The annular lands 81 and 83 in the present invention are no different individually than in the prior art device, but it is one important aspect of the present invention to make possible a greater number of the annular lands 81 and 83, resulting in a substantial increase in the total viscous shear area.

Referring still to FIG. 2, the cover member 77 includes a plurality of radially-oriented cooling fins, generally designated 85, each of the cooling fins 55 comprising a forward cooling fin portion 87, and a peripheral cooling fin portion. It is an important aspect of the present invention that the radial extent of each of the relatively more efficient forward cooling fin portions 87 is substantially increased, whereas the radial extent of each of the relatively less efficient peripheral cooling fin portions 89 has been substantially decreased.

In accordance with an important aspect of the present invention, the housing member 75 includes a radially-extending, flange-like portion 91 which defines an annular outer surface 93. The cover member 17 includes an axially-extending flange-like portion 95, defining an annular inner surface 97. The annular outer surface 93 and annular inner surface 97 are in facing engagement with each other, with the cover member 77 being joined or attached to the housing member 75 by means of a rollover of the terminal portion of the flange-like portion 95.

Although not an essential feature of the present invention, the improved construction illustrated in FIG. 2 is facilitated by the fact that the radially-extending flange-like portion 91 and the axially-extending flange-like portion 95 each define two sides of a gland in which is disposed an O-ring 99. The only difference between the O-ring 99 and the O-ring 65 of the prior art device is that the O-ring 99 is larger in diameter, as a result of the improved structure of the invention. Preferably, the O-ring 99 pilots on the inside diameter, rather than piloting on its outside diameter as is usually done in the prior art. It will be appreciated by those skilled in the art that the above-described portions 91, 93 and the arrangement of the O-ring 99 takes up substantially less space in the radial dimension than does the corresponding structure in the prior art device. Therefore, with both the prior art device, and the coupling of the present invention having the same overall radius R, it is possible for the device of the present invention to have a viscous shear area which is larger radially, and which has a greater mean radius, as will be discussed more specifically hereinafter.

It is another important aspect of the present invention that the cover member 77 defines an annular inner surface 101 which defines the outer periphery of the operating chamber 31 (and the viscous shear area). As a result, heat which is generated toward the outer periphery of the shear area is transmitted from the annular inner surface 101 through an adjacent annular wall portion 103 of the cover member 77 to the peripheral cooling fin portion 89. It is believed that this arrangement substantially increases the dissipation of heat from the outer periphery of the viscous shear space. One reason for this increased heat dissipation is that the heat is being transmitted to fin portions 89 (rather than to rear fins 69 as in the prior art device) and the fin portions 89 are in the direct path of air flowing through the radiator.

COMPARISON OF PRIOR ART AND INVENTION

Referring now to both FIG. 1 and FIG. 2, the present invention will be compared to the device of the prior art. As was noted previously, both devices have the same overall radius R. By way of comparison, various dimensions of each of the devices are labeled, and in the case of each of the labeled dimensions, a comparison will be made to the overall radius R to illustrate the improvement which results from the present invention.

As mentioned in the background of the specification, it is one object of the invention to increase the torque-transmitting capability of the coupling device, without increasing the overall size of the device. In each device, the radius of the viscous shear area is labeled $R_V$. In the prior art device, $R_V$ is equal to about 0.80R, whereas, with the present invention, $R_V$ is equal to about 0.90R. It is believed that the object of the invention can be satisfactorily achieved as long as $R_V$ is in the range of about 0.87R to about 0.93R. It will be readily apparent to those skilled in the art that, because the present invention results in a substantial increase in $R_V$, there will be a corresponding increase in the mean radius of the viscous shear space of the present invention, compared to the prior art. As mentioned previously, torque-transmitting capability is directly proportional to the mean radius of the shear space and therefore, the torque-transmitting capability of the device of the invention is increased both by the increase in total shear area, and also by the increase in mean radius of the shear area.

As was also stated in the background of the specification, it is another object of the present invention to increase the heat dissipation capability of the coupling device, again preferably without increasing the overall size of the device. In each of the devices, the radial extent of the shear space, and therefore the radial extent of the relatively more efficient cooling fins has been labeled $R_C$, even though the labeled dimension is not an actual radius, but merely a radial extent. In the prior art device, $R_C$ is equal to about 0.30R, whereas in the device of the invention, $R_C$ is equal to about 0.40R. It will be readily appreciated by those skilled in the art that this increase in the radial extent of the efficient cooling fins will result in a substantial increase in total efficient fin area. A comparison of $R_C$ for the prior art and for the present invention indicates that the present invention results in an increase of more than 40 percent in the efficient fin area, compared to the prior art device.

Based upon a reading and understanding of the foregoing specification, those skilled in the art will appreciate that the present invention provides several advantages, as well as a number of design options, for different ways of benefiting from the invention. Partly by way of summary, the various advantages and options include the following: because the total shear area is increased, it is possible to use the same viscosity fluid and achieve increased torque-transmitting capability, or keep the torque-capability the same with a lower viscosity fluid; because of the greater radial extent of the shear area, it is possible to have a larger number of lands 81 and 83 which are machined with the usual precision to achieve greater total shear area, or to have a lesser number of lands 81 and 83 of a cheaper, less precise, as-cast construction to achieve approximately the same shear area as in the prior art while substantially reducing the manufacturing cost of the coupling device; because of the increase in efficient fin area, it is possible to have a coupling device of the same size with greater heat dissipation capability, or to provide a coupling device having the same heat dissipation capability as the prior art, but with decreased overall size.

The invention has been described in great detail sufficient to enable one skilled in the art to make and use the same. It is believed that upon a reading and understanding of the foregoing specification, various alterations and modifications will become apparent to those skilled in the art, and it is intended to include all such alterations and modifications as part of the invention, insofar as they come within the scope of the appended claims.

I claim:

1. A relatively high-torque fluid coupling device of the type including a first rotatable coupling assembly comprising a housing member and a cover member cooperating to defined a fluid chamber therebetween, and means for joining said housing member and said cover member, means associated with said first rotatable coupling assembly and disposed to separate the fluid chamber into a fluid operating chamber and a fluid reservoir chamber, a second rotatable coupling member disposed in said fluid operating chamber and being rotatable relative to said first rotatable coupling assembly, the forward surface of said second rotatable coupling member and an adjacent surface of said cover member cooperating to define a viscous shear space therebetween, comprising said forward surface of said rotatable coupling member and said adjacent surface of said cover member cooperating to defined a plurality of interdigitated lands and grooves, said cover member including a plurality of cooling fins disposed on the forward surface of said cover member, said cooling fins being operable to dissipate heat transmitted from said viscous shear space by said cover member, said first rotatable coupling assembly defining a maximum, predetermined radius R of said fluid coupling device, said cooling fins disposed on said forward surface of said cover member extending around the outer periphery of said cover member and defining a radius of approximately R, characterized by:
   (a) said means for joining said cover member and said housing member comprises said housing member and said cover member defining generally cylindrical surfaces in facing engagement, said surfaces being disposed rearwardly of said shear space; and
   (b) said cover member defining a first annular inner surface comprising the outer periphery of said fluid chamber, and said second rotatable coupling member including a first annular outer surface closely spaced apart from said first annular inner surface of said cover member, said first annular outer surface having a radius at least in the range of about 0.87R to about 93R. to increase substantially the radius of said viscous shear space and the radius of efficient cooling fins, in relationship to radius R of said fluid coupling device.

2. A fluid coupling device as claimed in claim 1 characterized by said first annular outer surface having a radius in the range of about 0.9R.

3. A fluid coupling device as claimed in claim 1 characterized by said means for joining said housing member and said cover member comprising said cover member including an axially-extending annular portion defining a second annular inner surface, and said housing member including a radially-extending portion defining a second annular outer surface, said second annular inner and outer surfaces comprising said surfaces in facing engagement.

4. A fluid coupling device as claimed in claim 3 characterized by said axially-extending portion including a rollover comprising said joining means.

5. A fluid coupling device as claimed in claim 1 characterized by said cover member comprising a cast metal member, and said cooling fins being cast integrally with said cover member.

6. A fluid coupling device as claimed in claim 1 characterized by said cooling fins being disposed about the outer periphery of said cover member and extending axially over at least a major portion of the axial extent of said fluid chamber.

7. A fluid coupling device as claimed in claim 1 characterized by valve means associated with said first rotatable coupling assembly and being disposed to separate said fluid chamber into a fluid operating chamber and a fluid reservoir chamber, said second rotatable coupling member being disposed in said fluid operating chamber.

8. A fluid coupling device as claimed in claim 7 characterized by said valve means being operable to control the flow of fluid between said reservoir chamber and said operating chamber and including control means associated with said valve means to effect the operation thereof in response to variations in a predetermined condition.

9. A relatively high-torque fluid coupling device of the type including a first rotatable coupling assembly comprising a housing member and a cover member cooperating to define a fluid chamber therebetween, and means for joining said housing member and said cover member, valve means associated with said first rotatable coupling assembly and disposed to separate said fluid chamber into a fluid operating chamber and a fluid reservoir chamber, a second rotatable coupling member disposed in said fluid operating chamber and being rotatable relative to said first rotatable coupling assembly, the forward surface of said second rotatable coupling member and an adjacent surface of said cover member cooperating to define a viscous shear space therebetween, comprising said forward surface of said rotatable coupling member and said adjacent surface of said cover member cooperating to define a plurality of interdigitated lands and grooves, said valve means being operable to control the flow of fluid between said reservoir chamber and said operating chamber, and including control means associated with said valve means to effect the operation thereof in response to variations in a predetermined condition, said cover member being operable to dissipate heat transmitted from said viscous shear space, said first rotatable coupling assembly defining a maximum, predetermined radius R of said fluid coupling device, said cover member including a plurality of cooling fine disposed on the forward surface of said cover member and extending around the outer periphery of said cover member and defining a radius of approximately R characterized by:

(a) said means for joining said cover member and said housing member comprises said housing member and said cover member defining generally cylindrical surfaces in facing engagement, said surfaces being disposed rearwardly of said shear space; and (b) said cover member defining a first annular inner surface comprising the outer periphery of said fluid operating chamber, and said second rotatable coupling member including a first annular outer surface closely spaced apart from said first annular inner surface of said cover member, said first annular outer surface having a radius at least in the range of about 0.87B to about 93R. to increase substantially the radius of said viscous shear space and the radius of efficient cooling fins, in relationship to the radius R of said fluid coupling device.

10. A fluid coupling device as claimed in claim 9 characterized by said first annular outer surface having a radius in the range of about 0.9R.

11. A fluid coupling device as claimed in claim 9 characterized by said means for joining said housing member and said cover member comprising said cover member including an axially-extending annular portion defining a second annular inner surface, and said housing member including a radially-extending portion defining a second annular outer surface, said second annular inner and outer surfaces comprising said surfaces in facing engagement.

12. A fluid coupling device as claimed in claim 11 characterized by said axially-extending portion including a rollover comprising said joining means.

13. A fluid coupling device as claimed in claim 11 characterized by seal means disposed between said axially-extending portion of said cover member and said radially-extending portion of said housing member said axially-extending portion defining two sides of a gland for said seal means, said radially-extending portion defining the other two sides of said gland.

* * * * *